United States Patent [19]

Shinmura et al.

[11] Patent Number: 5,479,567
[45] Date of Patent: Dec. 26, 1995

[54] FUZZY FEEDBACK CONTROLLER AND METHOD

[75] Inventors: Kazutaka Shinmura, Tokyo; Masakazu Ikoma, Kanagawa, both of Japan

[73] Assignees: Fuji Electric Co., Ltd., Kanagawa; Fuji Facom Corporation, Tokyo, both of Japan

[21] Appl. No.: 200,304

[22] Filed: Feb. 23, 1994

Related U.S. Application Data

[63] Continuation of Ser. No. 939,330, Sep. 2, 1992, abandoned.

[30] Foreign Application Priority Data

Sep. 3, 1991 [JP] Japan .................................. 3-250450

[51] Int. Cl.$^6$ .................................................. G06F 15/46
[52] U.S. Cl. .............................. 395/3; 395/61; 395/900; 364/161
[58] Field of Search ................................ 395/3, 61, 900, 395/903; 364/161, 162, 163

[56] References Cited

U.S. PATENT DOCUMENTS

| | | | |
|---|---|---|---|
| 4,903,192 | 2/1990 | Saito et al. | 364/157 |
| 4,910,684 | 3/1990 | Ostergaard et al. | 395/61 |
| 5,093,892 | 3/1992 | Orii | 395/900 |
| 5,104,109 | 4/1992 | Kubo | 395/900 |
| 5,149,472 | 9/1992 | Suganuma | 395/900 |
| 5,170,357 | 12/1992 | Sasaki et al. | 395/900 |
| 5,173,224 | 12/1992 | Nakamura et al. | 395/900 |
| 5,245,698 | 9/1993 | Matsunaga | 364/163 |
| 5,272,621 | 12/1993 | Aoki | 395/61 |

FOREIGN PATENT DOCUMENTS

| | | | |
|---|---|---|---|
| 481492 | 4/1992 | European Pat. Off. . | |
| 3-48303 | 3/1991 | Japan . | |
| 3-88001 | 4/1991 | Japan . | |
| 0088001 | 4/1991 | Japan | 364/161 |

OTHER PUBLICATIONS

"Rule Based Self–Organizing Controller", Kenji Sugiyama, Fuzzy Computing, pp. 341–353, 1988.
"Fuzzy Logic: An Introduction"; Elecktor Electronics, pp. 80–83, Jul. 1992.
British Search Report.
"Fuzzy Control is About to be Put Into Practical Use; Instuition and Experience of a Skilled Person is Made into Rules", Michio Sugano, Nikkei Mechanical, pp. 54–65, Jun. 18, 1984.
"On the Design of Fuzzy Control Systems", Shigeyasu Kawaji et al., 19th Symposium of Control Theory, pp. 313–318, May, 1990.
"Feedback Control by Fuzzy Rule", Seiji Kawai et al., Factory Automation, pp. 63–65, Mar. 1991.
"Feedback Control Method by Fuzzy Rule", K. Shinmura et al., Manuscript for the 30th Automatic Control Lecture Meeting, pp. 541–542.

*Primary Examiner*—Robert W. Downs
*Attorney, Agent, or Firm*—Finnegan, Henderson, Farabow, Garrett & Dunner

[57] ABSTRACT

A fuzzy feedback controller is designed as follows: A deviation between a process value and a set value, and a variation of the deviation are obtained with the aid of an arithmetic memory device, and the deviation and the variation of the deviation are normalized with normalizing devices. A fuzzy inference operating device performs a fuzzy inference by using the deviation and the variation of the deviation thus normalized, to obtain a control output variation. The control output variation is normalized with another normalizing device. The control output variation Δu thus normalized is added to the preceding control output in an addition device, to form a new control output, which is applied to an operating device. A parameter adapting device makes normalizing parameters adaptive according to the response waveform of the process value.

14 Claims, 5 Drawing Sheets

FUZZY FEEDBACK CONTROLLER AND METHOD

This application is a continuation of application Ser. No. 07/939,330, filed Sep. 2, 1992, now abandoned.

BACKGROUND OF THE INVENTION

The present invention relates to a fuzzy feedback controller or method which, in a process control, determines a control output by fuzzy inference so that a process value coincides with an aimed value, and causes an operating device to control an object which is to be controlled.

Heretofore, in a process control, a PID (proportion, integration, and differentiation) control is generally employed. On the other hand, recently, in view of the fact that the PID control becomes unstable if control parameters are not suitably adjusted, a fuzzy feedback control of control parameter setting type has been proposed in the art in which, instead of the PI control, the fuzzy control is employed, and rules are added for prevention of the occurrence of unstable phenomena (cf. "Feedback Control Method by Fuzzy Rules", pp. 541 and 542, a manuscript for the 30-th Automatic Control Lecture Meeting).

The PID control is disadvantageous in the following points: That is, if it is intended to improve the quick response at the time of rise, then the overshoot is increased; and when it is intended to improve the attenuation in the period of stabilization, then the rise is delayed.

Hence, in order to realize both the satisfactory quick response and the attenuation, when the control characteristics is switched separately according to whether it is the time of rise or whether it is the time of stabilization, it is necessary to change a plurality of control parameters such as proportion gain, integration time, and differentiation time during control. Furthermore, when the process is changed in characteristic, the control is greatly lowered in performance if the control parameters are not suitably adjusted.

On the other hand, in the conventional fuzzy feedback control, membership functions are fixed for a given process, and therefore whenever it is required to change the control parameters, the membership functions in memory in the controller must be changed. Furthermore, in practice, the control parameters must be studied according to the contents of a given process, before set in the controller. This operation is rather troublesome.

SUMMARY OF THE INVENTION

In view of the foregoing, an object of the present invention is to provide a fuzzy feedback controller and method in which the control parameters can be adjusted without change of the membership functions, and the control is substantially equivalent in performance to the PI control, and which is improved both in quick response and in attenuation.

In order to achieve the above-described object of the invention, according to first method and apparatus aspects of the present invention, there is provided a fuzzy feedback controller in which a process value of an object to be controlled is fed back, and a deviation between the process value thus fed back and a set value and a variation of the deviation are used, so that a control output for causing the process value to coincide with the set value is determined by fuzzy inference and outputted, in which the fuzzy inference is carried out by using: fuzzy control rules in which, in a phase plane with the deviation and the variation of the deviation as coordinates axes, a reference straight line is provided with which a speed type control output variation of PI control is zero, the phase plane is divided into rectangles equal in size in such a manner that the vertexes thereof are on the reference straight line and a parallel line with respect to the reference straight line, and a control output variation corresponding to the distance between the reference straight line and the parallel line is so defined as to be proportional to the absolute values of the deviation and the variation of the deviation; antecedent membership functions concerning the deviation and the variation of the deviation as fuzzy variables, the centers of isosceles triangles of the antecedent membership functions being deviation components and deviation variation components of the coordinates of the centers of the rectangles; and consequent membership functions concerning a control output variation as fuzzy variables, the centers of isosceles triangles of the consequent membership functions being defined by the distance between the reference straight line and parallel straight line.

According to second method and apparatus aspects of the present invention, in the above described fuzzy feedback controller, the deviation, the variation of the deviation, and the control output variation are normalized at least with respective reference variation widths. Alternatively, the deviation, the variation of the deviation, and the control output variation are normalized with respective reference variation widths, and a PI control parameter; or with respective reference variation widths, a process gain, and a total delay time; or with respective variation widths, and an oscillation period and damping factor of a response waveform under control.

According to third method and apparatus aspects of the present invention, in the above described fuzzy feedback controller, the consequent membership functions concerning the control output variation are such that a parameter value for a fuzzy variable small in absolute value is decreased, and a parameter value for a fuzzy variable large in absolute value is increased. The third aspect of the invention is to realize a non-linear PI control.

In this case, it is preferable that, when the deviation and the variation of the deviation are different in sign, asymmetrical fuzzy control rules are employed.

According to the first aspects of the invention, the PI control rules are represented by the fuzzy control rules, and fuzzy inference is carried out by using the predetermined membership functions. Hence, the fuzzy control can be realized which is equivalent in control characteristic to the PI control.

According to the second aspects of the invention, the fuzzy inference is carried out with the deviation and the variation of the deviation normalized. Hence, even when the range width is changed by variation of the parameters of the process, the adaptive range width can be changed by variation of the normalized parameters without variation of the membership functions in the memory device. Thus, the control parameters can be made adaptive with ease.

According to the third aspects of the invention, when the deviation and the variation of the deviation are equal in sign and large in value, the control output variation is made larger than in the case of the PI control, so that the process variation (i.e., increase of the deviation and the variation of the deviation) can be suppressed, with the result that the control is improved in quick response characteristic.

Moreover, when the deviation and the variation of the deviation are equal in sign and small in value, the damping characteristic of the process value can be improved by making the control output variation smaller than in the PI control.

In the case where the deviation and the variation of the deviation are different in signal, the control output variation is so decreased as to weaken the integration term for PI control, as a result of which the overshoot is suppressed, and the non-linear PI control is achieved with high stability.

DETAILED DESCRIPTION OF THE INVENTION

In a PI control, with respect to a deviation $e_i$ between a process value and a set value, and a variation $\Delta e_i$ of the deviation, a speed type control output variation $\Delta u_i$ is determined according to the following Equation (1):

$$\Delta u_i = K_c \{\Delta e_i + (\tau/T_i) e_i\} \quad (1)$$

where $K_c$ is the proportion gain which is a PI parameter,
$T_i$ is the integration time which is also a PI parameter, and $\tau$ is the sampling time.

In addition, $e_i = r_i - x_i$, and $\Delta e_i = e_i - e_{i-1}$, where r is the set value, x is the process value, and the suffix i means the i-th control sampling.

With respect to a phase plane in which the deviation e is plotted on the x-axis, and the variation $\Delta e$ of the deviation is plotted on the y-axis, the PI control system is represented by the following control laws (1), (2) and (3):

(1) According to the above-described Equation (1), at the point where $\Delta e_i + (\tau/T_i) e_i = 0$ is established, $\Delta u_i = 0$, and an assembly of those points is a straight line with a slope of $(-\tau/T_i)$, and intercepts of 0.

(2) In the case where, in connection with the above-described Equation (1), the following Equation (2):

$$G(e, \Delta e) = \Delta e + (\tau/T_i) e \quad (2)$$

is defined, $\Delta u_i > 0$ in a region where $G(e_i, \Delta e_i) > 0$, and $\Delta u_i < 0$ in a region where $G(e_i, \Delta e_i) < 0$.

(3) The magnitude of $\Delta u_i$ is proportional to the distance between a point $(e_i, \Delta e_i)$ and a straight line $L: \Delta e + (\tau/T_i) = 0$ (hereinafter referred to as "a reference straight line L" for convenience in description, when applicable).

In connection with the above-described Equation (1), the region of a point $(e_i, \Delta e_i)$ where $\Delta u_i$ is constant is a straight line which is parallel with the reference straight line L and has a slope of $(-\tau/T_i)$.

If, in the case of $\Delta u_i = 0$, the value of $\Delta e_i$ satisfying $\Delta u_i = 0$ with respect to a reference variation width A (when $e_i = A$) corresponding to the process is represented by $-B$, then the following Equation (3) is established:

$$B = (\tau/T_i) A \quad (3)$$

A straight line passing through two points (A,0) and (0,B) in a (e, $\Delta e$) phase plane has a slope of $(-\tau/T_i)$, and is parallel with the reference straight line L representing the assembly of points $(e_i, \Delta e_i)$ satisfying $\Delta u_i = 0$. A control output variation $\Delta u_i$ determined from points $(e_i, \Delta e_i)$ on the straight line can be represented by the following Equation (4) which is based on the above-described Equations (1) and (3):

$$\Delta u_i = K_c \{\Delta e_i + (\tau/T_i) e_i\} = K_c (\tau/T_i) A \quad (4)$$

When $K_c (\tau/T_i) A = C$ is put in Equation (4), then with respect to the reference variation width A and B of $e_i$ and $\Delta e_i$, the reference value of $\Delta u_i$ is C.

Therefore, e, $\Delta e$ and $\Delta u$ can be normalized by using the reference variation widths A, B and C as follows:

$$e \rightarrow e/A$$

$$\Delta e \rightarrow \Delta e/B$$

$$\Delta u \rightarrow \Delta u/C$$

As is seen from Equation (3), B is proportional to the reciprocal of the integration time which is a PI control parameter. Similarly, from Equations (3) and (4), $C = K_c B$. Hence, C is proportional to the proportion gain which is also a PI control parameter.

The normalization of e, $\Delta e$ and $\Delta u$ may be carried out by using the reference variation widths, process gain, and total delay time, or it may be performed by using the reference variation widths, and the oscillation frequency and damping factor of a response waveform which is being controlled.

When the above-described control laws (1), (2) and (3) for PI control are represented by using the fuzzy control rules, and the membership functions are determined by using Equations (3) and (4) indicating the relationships between ($K_c$, $T_i$ and $\tau$) and (A, B and C), the fuzzy control can be realized which is equivalent in control characteristic to the PI control.

Figure 2:
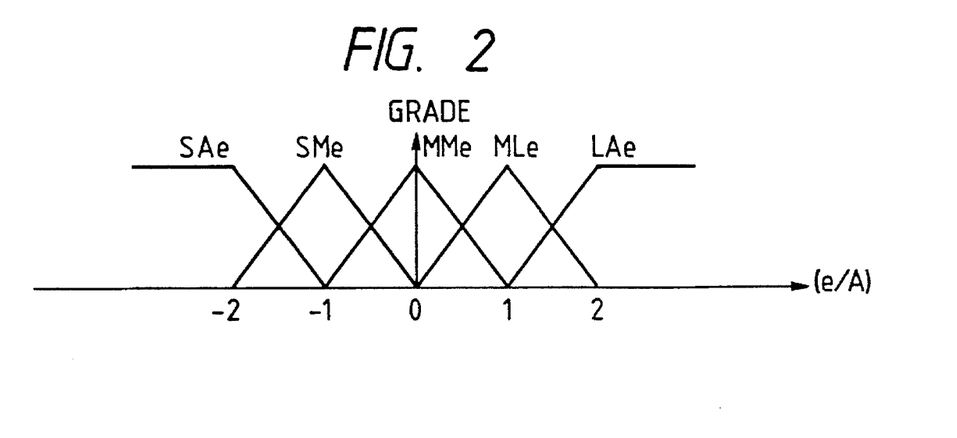
FIG. 2 is an explanatory diagram showing fuzzy control antecedent part membership functions for realization of a PI control.
Figure 3:
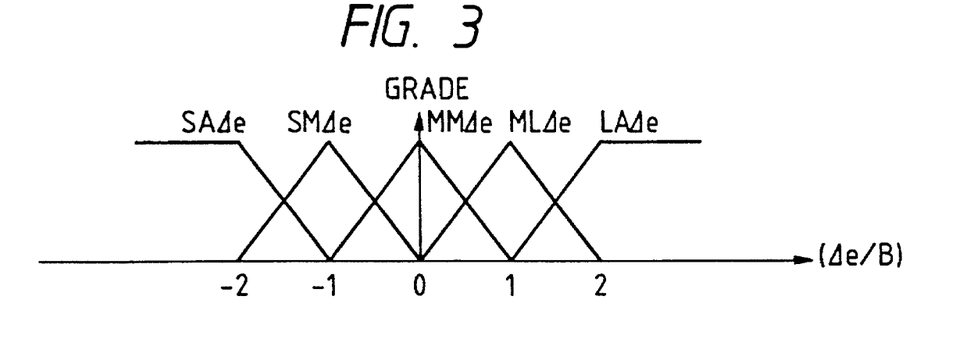
FIG. 3 is also an explanatory diagram showing fuzzy control antecedent part membership functions for realization of the PI control.
Figure 4:
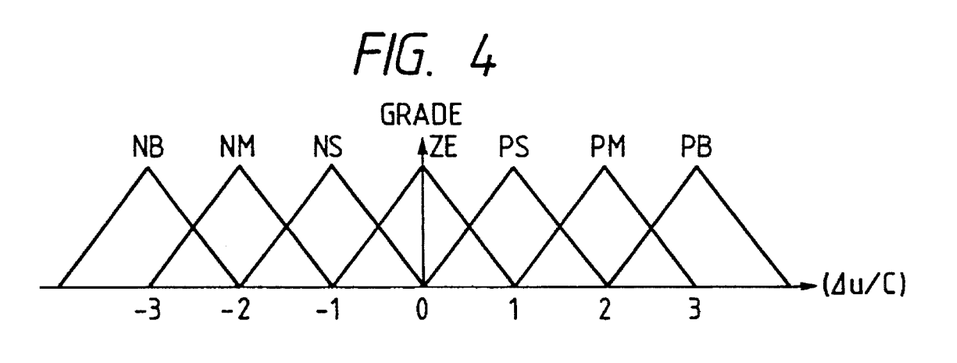
FIG. 4 is an explanatory diagram showing fuzzy control consequent part membership functions for realization of the PI control.

The following Table 1 indicates the fuzzy control rules according to the control laws (1), (2) and (3). FIGS. 2 and 3 (antecedent part) and FIG. 4 (consequent part) show the membership functions. When a fuzzy inference is performed by using those control rules and membership functions, a fuzzy control can be achieved which is equivalent in performance to the PI control.

TABLE 1

|  | e | | | | |
|---|---|---|---|---|---|
| $\Delta e$ | SA | SM | MM | ML | LA |
| LA | ZE | PS | PM | PB | PB |
| ML | NS | ZE | PS | PM | PB |
| MM | NM | NS | ZE | PS | PM |
| SM | NB | NM | NS | ZE | PS |
| SA | NB | NB | NM | NS | ZE |

In Table 1, "SA" is an abbreviation for "small", "SM" for "small medium", "MM" for "medium medium", "ML" for "medium large", "LA" for "large", "ZE" for "zero", "PS" for "positive small", "PM" for "positive medium", "PB" for "positive big", "NS" for "negative small", "NM" for "negative medium", and "NB" for "negative big".

In the above-described fuzzy control, $\Delta u$ is processed as follows: That is, when $e=e_i$ and $\Delta e=\Delta e_i$, and in a phase plane (e, $\Delta e$), the distance between the reference straight line L with $\Delta u=0$ and a point ($e_i$, $\Delta e_i$) where $e_i$ and $\Delta e_i$ have the same sign is small, $\Delta u$ is made smaller than determined from the above-described Equation (1) in the PI control; and when the distance is large, it is made larger.

In the case where $e_i$ and $\Delta e_i$ are different in sign, $\Delta u$ should be decreased so as to weaken the integration term (term of e) in Equation (1). In this case, control characteristics corresponding to those of a non-linear PI control can be realized which are resulted from improvement of the control characteristics of the PI control system.

Figure 5:
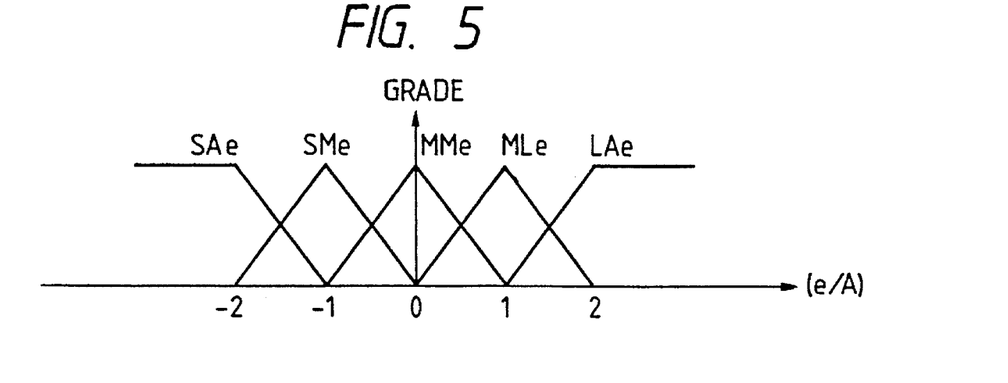
FIG. 5 is an explanatory diagram showing fuzzy control antecedent part membership functions for realization of a non-linear PI control.
Figure 6:
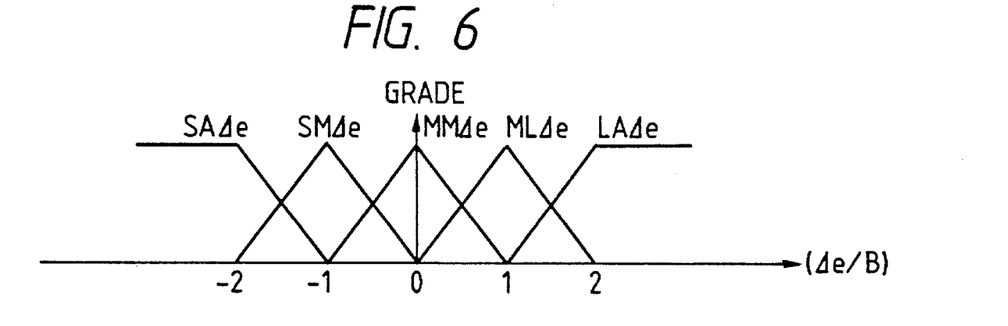
FIG. 6 is also an explanatory diagram showing fuzzy control antecedent part membership functions for realization of the non-linear PI control.
Figure 7:
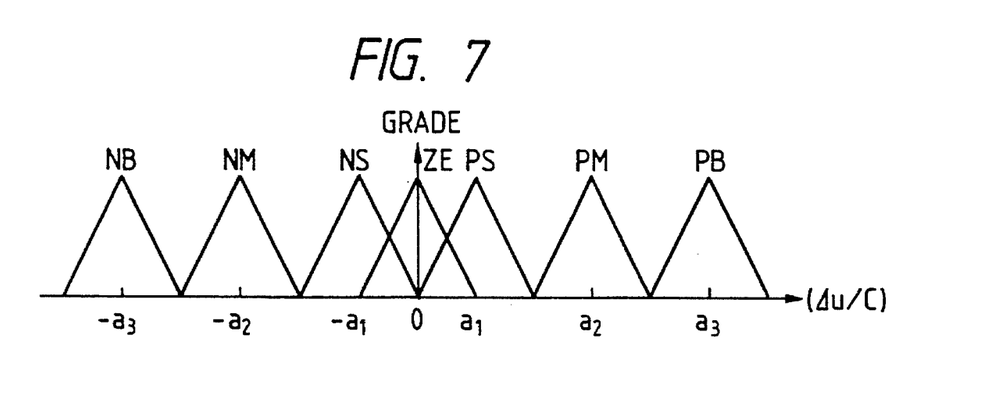
FIG. 7 is an explanatory diagram showing fuzzy control consequent part membership functions for realization of the non-linear PI control.

The following Table 2 indicates fuzzy control rules for realization of the non-linear PI control. In Table 2, the control rules are asymmetrical with respect to the reference straight line of $\Delta u=0$. FIGS. 5 and 6 (antecedent part) and FIG. 7 (consequent part) show the membership functions. When a fuzzy inference is performed by using those control rules and membership functions, the fuzzy control can be achieved which corresponds to the non-linear PI control.

TABLE 2

|  | e | | | | |
|---|---|---|---|---|---|
| $\Delta e$ | SA | SM | MM | ML | LA |
| LA | ZE | PS | PM | PB | PB |
| ML | ZE | ZE | PS | PM | PB |
| MM | NM | NS | ZE | PS | PM |
| SM | NB | NM | NS | ZE | ZE |
| SA | NB | NB | NM | NS | ZE |

With respect to a response waveform of an object to be controlled, there are laws; that is, the oscillation period is proportional to the total delay time of the process, and the damping factor is proportional to the product of process gain and control gain. Hence, by making B inversely proportional to the oscillation period and by making C inversely proportional to the damping factor, a parameter tuning-less function can be realized.

Figure 1:
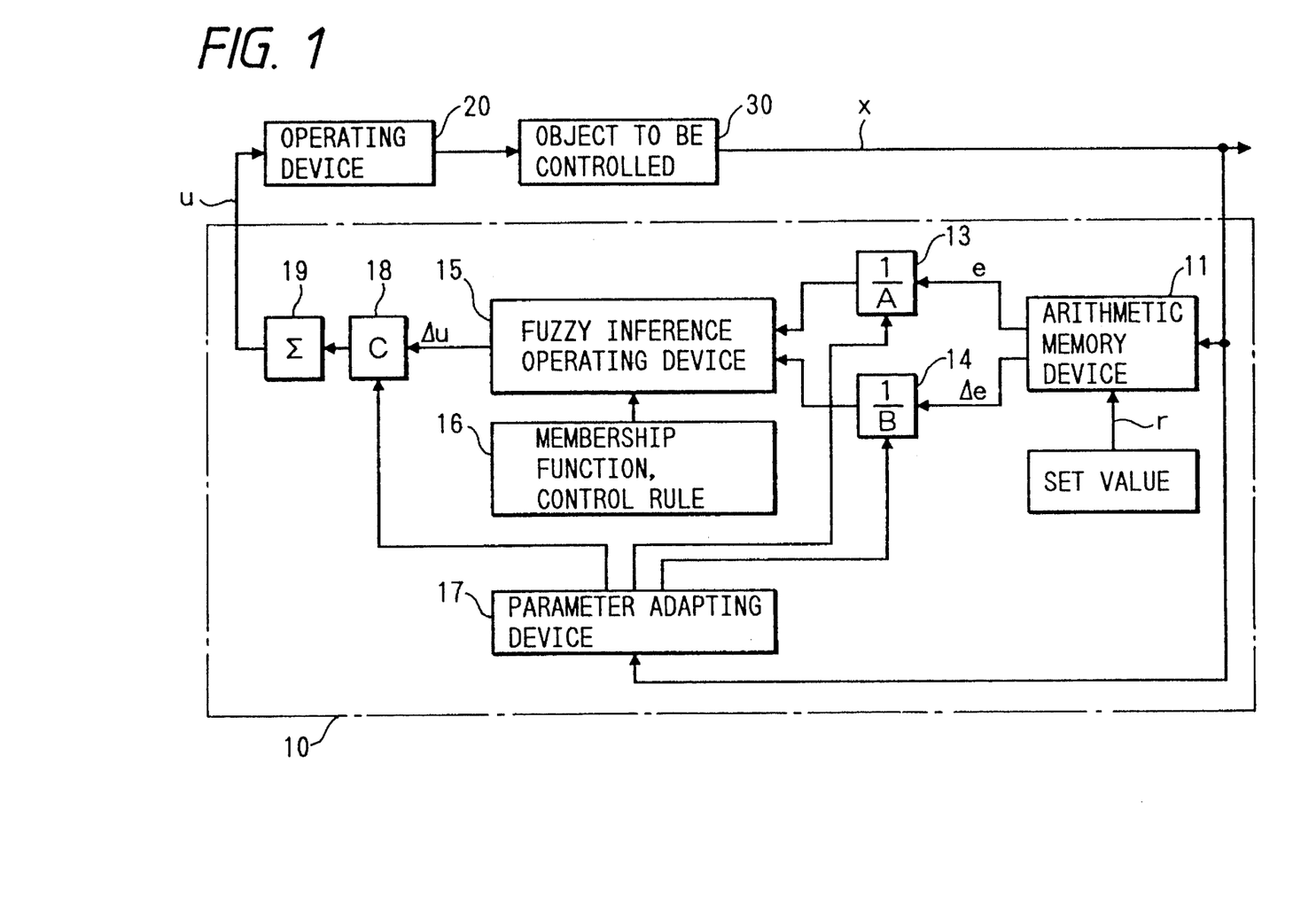
FIG. 1 is a block diagram outlining the arrangement of one embodiment of the present invention.

FIG. 1 is a block diagram outlining the arrangement of one example of a fuzzy feedback controller according to the invention. In FIG. 1, reference numeral 10 designates the fuzzy feedback controller of the invention; 20, an operating device for operating an operating terminal with the aid of a control output u provided by the controller 10; and 30, an object to be controlled.

A process value x of the object 30 to be controlled is applied to an arithmetic memory device 11 in the controller 10. The device 11 calculates the deviation e between the process value x and a set value r, and compares it with the preceding deviation stored in it, thereby to obtain a variation $\Delta e$ of the deviation.

The deviation e obtained by the arithmetic memory device 11 is supplied to a first normalizing device 13, where it is subjected to normalization; and the variation $\Delta e$ of the deviation is supplied to a second normalizing device 13, where it is subjected to normalization. The deviation e and the variation $\Delta e$ thus normalized are applied to a fuzzy inference operating device 15.

The fuzzy inference operating device 15 performs a fuzzy inference by using the above-described fuzzy control rules and membership functions 16 for realizing PI control, and the deviation e and the deviation variation $\Delta e$ which have been normalized, to provide a control output variation $\Delta u$. The control output variation $\Delta u$ is applied to a normalizing device 18, where it is normalized. The output of the normalizing device 18 is supplied to an addition device 19.

In the addition device 19, the control output variation $\Delta u$ is added to the preceding control output stored in it, to provide a control output u, which is applied to the operating device 20.

The operating device 20 operates the operating terminal according to the control output u, thereby to control the object 30.

The controller 10 further comprises a parameter adapting device 17. The parameter adapting device 17 automatically adjust control parameters as follows:

At the start of control by the controller 10, the parameter adapting device 17 receives the process value x, and calculates a process operation level to determine a normalizing parameter A. The parameter A is supplied to the normalizing device 13, to normalize the deviation e. Thereafter, the parameter adapting device 17, while detecting characteristic data such as the oscillation period and oscillation width of the response waveform of the process under control, adjusts the normalizing parameters B and C successively. Those parameters B and C are supplied to the normalizing devices 14 and 18 so as to normalize the deviation variation $\Delta e$ and the control output variation $\Delta u$, respectively.

A procedure of adjusting the parameters B and C is as follows: (1) In the case where no oscillation occurs with the response waveform when initially set, then the parameter C is increased until an oscillation occurs (in the case where the response waveform is in oscillation, the operation is started with the following (2)). (2) When an oscillation is detected, then the oscillation period is obtained, and the parameter B is made adaptive. (3) The parameter C is made adaptive according to the oscillation width and damping factor.

It should be noted that when the parameter A is determined, the above-described control operation is not carried out; however, when the parameters B and C are determined, the control operation is carried out.

FIGS. 8 through 11 show control response waveforms indicating the results of simulations conducted with the fuzzy non-linear PI controller according to the invention. FIGS. 12 through 15 show control response waveforms indicating the results of simulations conducted with the conventional PI controller.

Figure 16:
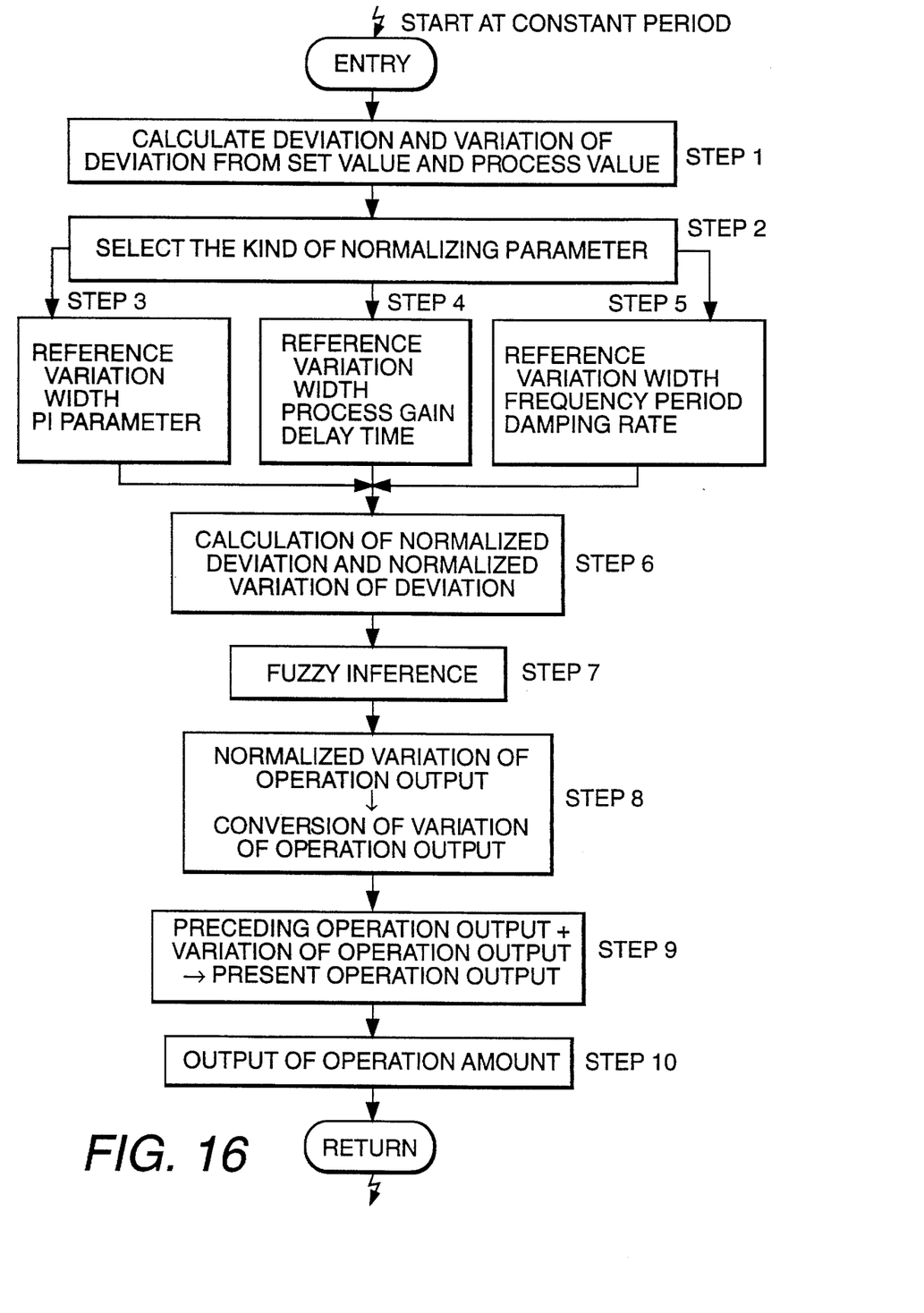
FIG. 16 is a flow chart representing process steps of the invention.

FIG. 16 is a flow diagram which represents process steps employed in the preferred embodiment of the invention. In Step 1, the value X of the controller process variable X is obtained and the deviation and variation of the deviation between the process value and a setpoint value are calculated.

In Step 2, the normalizing parameters A, B, or C (FIG. 1) is selected for determination. Step 3, 4, and 5 determined the respective parameters when selected.

The normalized deviation of the controller variable and the normalized variation of the deviation are calculated in Step 6. A fuzzy inference is performed in Step 7.

A normalized variation of the fuzzy inference output is determined and converted in Step 8. The preceding output and the variation of the operation output are summed in Step 9 to obtain the present operation output. Finally, in Step 10, the output is applied to the process device which controls the controller process variable.

Figure 8:
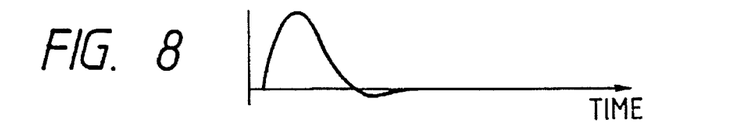
FIG. 8 is a waveform diagram showing a control response waveform of a fuzzy non-linear PI controller.
Figure 12:
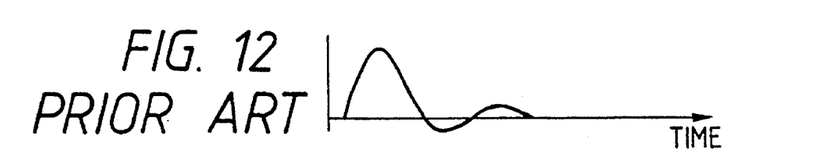
FIG. 12 is a waveform diagram showing a control response waveform of a conventional PI controller.

The control response waveform shown in FIG. 8 is provided by the fuzzy non-linear PI controller when the adjustment is made best, and the control response waveform shown in FIG. 12 is provided by the PI controller when the adjustment is made best. It can be understood that their control performances are substantially equal to each other.

Figure 9:
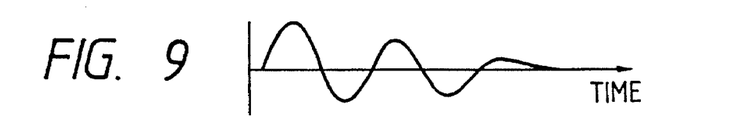
FIG. 9 is a waveform diagram showing a control response waveform of the fuzzy non-linear PI controller.
Figure 10:
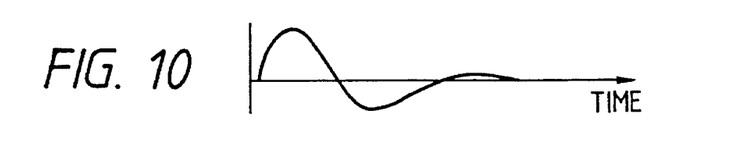
FIG. 10 is a waveform diagram showing a control response waveform of the fuzzy non-linear PI controller
Figure 11:
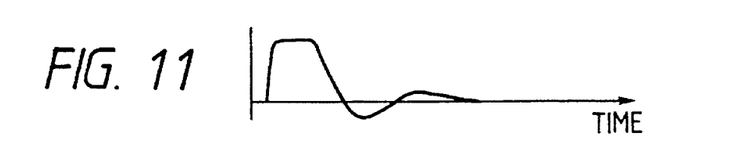
FIG. 11 is a waveform diagram showing a control response waveform of the fuzzy non-linear PI controller.
Figure 13:
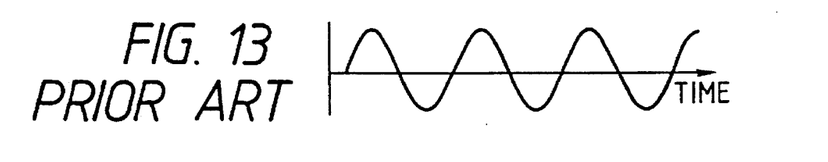
FIG. 13 is a waveform diagram showing a control response waveform of the conventional PI controller.
Figure 14:
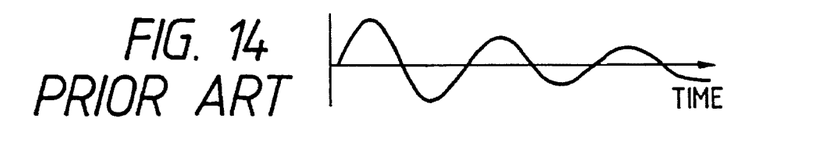
FIG. 14 is a waveform diagram showing a control response waveform of the conventional PI controller.
Figure 15:
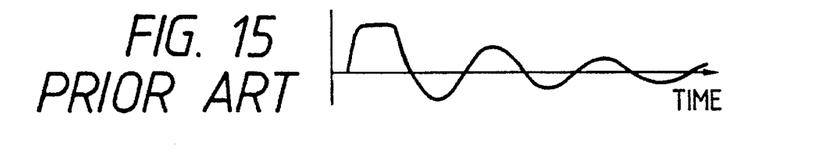
FIG. 15 is a waveform diagram showing a control response waveform of the conventional PI controller.

FIG. 9 shows a control response waveform of the fuzzy non-linear PI controller provided when the process gain is varied (1.8 times). FIG. 10 also shows a control response waveform of the fuzzy non-linear PI controller provided when the process total time constant (waste time+time constant) is varied (2.0 times). Furthermore, FIG. 11 shows a control response waveform of the fuzzy non-linear PI controller provided when the {(waste time)/(time constant)} is varied (8.0 times). FIGS. 13, 14 and 15 show control response waveforms of the PI controller under the same conditions as those described above, respectively.

As is apparent from those figures, with the fuzzy non-linear PI controller, owing to its non-linear gain characteristic the quick response and the attenuation are improved, and the stabilization period is shortened. In addition, by changing the control system, for instance, by a method in which the integration is weakened when the deviation and the variation of the deviation are different in sign from each other, the overshoot can be suppressed, and the control is improved in stability when the time constant and waste time are varied.

As was described above, according to the present invention, the relationships between the reference control parameters for PI control and the control parameters for fuzzy control are clarified. Therefore, by determining the membership functions according to the above-described relationships, the fuzzy control can be achieved which is equivalent in control characteristic to the PI control.

Further, in the present invention, the deviation, and the variation of the deviation which are normalized are used to perform the fuzzy inference. Hence, when the control parameters are changed, only the normalized parameters should be changed; that is, it is unnecessary to change the membership functions stored in memory. Thus, the troublesome operation can be eliminated which is otherwise necessary when the control parameters are changed.

Furthermore, according to the present invention, the non-linear PI control is realized, and therefore the control is improved in response characteristic. In addition, the damping characteristic is improved, with the results that the stabilization period is reduced, and the overshoot is suppressed.

What is claimed is:

1. A fuzzy feedback control system for regulating a process value of an object with improved stability and accuracy, said control system comprising:

means for generating a deviation between an actual process value from the object and a set value;

means for generating a variation of the deviation;

means for determining a fuzzy control rule including:

means for representing a reference straight line in a phase plane with said deviation and said variation of said deviation as coordinate axes, a speed type control output variation of proportional/integral control being zero, and said representing means dividing said phase plane into rectangles equal in size in such a manner that vertices of said rectangles are on said reference straight line and a line parallel with said reference straight line; and means for regulating a variation of control output in correspondence to a distance between said reference straight line and said parallel line which is so defined as to be proportional to absolute values of said deviation and said variation of said deviation;

means for regulating antecedent membership functions concerning said deviation and said variation of said deviation as fuzzy variables, with centers of isosceles triangles of said antecedent membership functions being deviation components and deviation variation components of coordinates of centers of said rectangles;

means for regulating consequent membership functions concerning a control output variation as fuzzy variables, with centers of isosceles triangles of said consequent membership functions being defined by a distance between said reference straight line and said parallel straight line;

means for determining, by fuzzy inference, a variation of said control output using said fuzzy control rule, said antecedent membership functions, said consequent membership functions, a representation of said deviation, and a representation of said variation of said deviation; and means for applying the control output, as varied by fuzzy inference, to control the object.

2. A fuzzy feedback control system as claimed in claim 1, further comprising means for normalizing said deviation, said variation of said deviation, and said control output variation at least with respective reference variation widths.

3. A fuzzy feedback control system as claimed in claim 2, in which said normalizing means further normalizes said deviation, said variation of said deviation, and said control output variation with said respective reference variation widths, and a proportional/integral control parameter.

4. A fuzzy feedback control system as claimed in claim 2, in which said normalizing means further normalizes said deviation, said variation of said deviation, and said control output variation with said respective reference variation widths, a process gain, and a time delay.

5. A fuzzy feedback control system as claimed in claim 2, in which said normalizing means further normalizes said deviation, said variation of said deviation, and said control output variation with said respective reference variation widths, and an oscillation period and damping factor of a response waveform under control.

6. A fuzzy feedback control system as claimed in claim 1 or 2 or 3 or 4 or 5, in which said means for regulating consequent membership functions generates said consequent membership functions such that a parameter value for a fuzzy variable small in absolute value is decreased, and a parameter value for a fuzzy variable large in absolute value is increased.

7. A fuzzy feedback control system as claimed in claim 6, in which, when said deviation and said variation of said deviation are different in sign, said means for determining a variation applies said fuzzy control rule asymmetrically thereto.

8. A fuzzy feedback control system which determines a control output by fuzzy inference so that a process value coincides with a set value, and causes an operating device to control an object to be controlled, comprising:

means for generating an actual process value from the object;

an arithmetic memory device for obtaining a deviation between a process value and a set value, and a variation of said deviation;

a first normalizing device for generating a normalized deviation from said deviation;

a second normalizing device for generating a normalized variation of said deviation from said variation of said deviation;

a fuzzy inference operating device for performing a fuzzy inference by using fuzzy control rules, membership functions, said normalized deviation and said normalized variation of said deviation, to obtain a control output variation;

a third normalizing device for generating a normalized control output variation from said control output variation;

an addition device for determining a present control output by adding said normalized control output variation to a preceding control output stored in said addition device, and for applying said present control output to said operating device;

a parameter adapting device for determining and applying a first normalizing parameter for said first normalizing device, a second normalizing parameter for said second normalizing device and a third normalizing parameter for said third normalizing device, respectively, said second and third normalizing parameters being adjusted based on a response waveform of said process value; and means for applying the present control output to the operating device to control the object.

9. A fuzzy feedback controlling method for operating a fuzzy inference control system to regulate a process value of an object with improved stability and accuracy, the steps of said method comprising operating a fuzzy inference control system as follows:

determining a fuzzy control rule including the substeps of:
    representing a reference straight line in a phase plane with a deviation and a variation of said deviation as coordinates axes, a speed type control output variation of a proportional/integral control being zero;
    generating a deviation between an actual process value from the object and a set value;
    generating a variation of the deviation;
    dividing said phase plane into rectangles equal in size in such a manner that vertices of said rectangles are on said reference straight line and a line parallel with said reference straight line; and
    regulating a variation of a control output variation corresponding to a distance between said reference straight line and said parallel line which is so defined as to be proportional to absolute values of said deviation and said variation of said deviation;
    regulating antecedent membership functions concerning said deviation and said variation of said deviation as fuzzy variables, with centers of isosceles triangles of said antecedent membership functions being deviation components and deviation variation components of coordinates of centers of said rectangles;

regulating consequent membership functions concerning a control output variation as fuzzy variables, with centers of isosceles triangles of said consequent membership functions being defined by a distance between said reference straight line and said parallel straight line;

normalizing said deviation, and said variation of said deviation at least with respective reference variation widths;

determining by fuzzy inference a variation of said control output using said fuzzy control rule, said antecedent membership functions, said consequent membership functions, said normalized deviation, and said normalized variation of said deviation;

normalizing said variation of said control output at least with a reference variation width; and applying the control output, as varied by fuzzy inference, to control the object.

10. A method as claimed in claim 9, in which said normalizing steps further normalize said deviation, said variation of said deviation, and said control output variation with said respective reference variation widths, and a proportional/integral control parameter.

11. A method as claimed in claim 9, in which said normalizing steps further normalize said deviation, said variation of said deviation, and said control output variation with said respective reference variation widths, a process gain, and a time delay.

12. A method as claimed in claim 9, in which said normalizing steps further normalize said deviation, said variation of said deviation, and said control output variation with said respective reference variation widths, and an oscillation period and damping factor of a response waveform under control.

13. A method as claimed in claim 9, or 10, or 11, or 12 in which the regulating consequent membership functions step regulates said consequent membership functions such that a parameter value for a fuzzy variable small in absolute value is decreased, and a parameter value for a fuzzy variable large in absolute value is increased.

14. A method as claimed in claim 13, in which, when said deviation and said variation of said deviation are different in sign, the fuzzy inference determining step further applies the fuzzy control rule asymmetrically thereto.

* * * * *